United States Patent
You et al.

(10) Patent No.: US 8,620,744 B2
(45) Date of Patent: Dec. 31, 2013

(54) SYSTEMS AND METHODS FOR LIST RANKING AND ADS PLACEMENT USING INTERACTION FEATURES

(75) Inventors: Siyu You, Beijing (CN); Jiacheng Guo, Beijing (CN); Quansheng Duan, Beijing (CN)

(73) Assignee: Yahoo! Inc., Sunnyvale, CA (US)

( * ) Notice: Subject to any disclaimer, the term of this patent is extended or adjusted under 35 U.S.C. 154(b) by 323 days.

(21) Appl. No.: 12/982,539

(22) Filed: Dec. 30, 2010

(65) Prior Publication Data

US 2012/0143672 A1 Jun. 7, 2012

Related U.S. Application Data

(63) Continuation of application No. PCT/CN2010/001976, filed on Dec. 6, 2010.

(51) Int. Cl.
*G06Q 30/00* (2012.01)
(52) U.S. Cl.
USPC ............. 705/14.42; 705/14.43; 705/14.46; 705/14.49; 705/14.51
(58) Field of Classification Search
USPC ........................................ 705/14.42
See application file for complete search history.

(56) References Cited

U.S. PATENT DOCUMENTS

| | | | | |
|---|---|---|---|---|
| 2004/0186776 A1* | 9/2004 | Llach | | 705/14 |
| 2009/0240677 A1* | 9/2009 | Parekh et al. | | 707/5 |
| 2009/0265227 A1 | 10/2009 | Langford et al. | | |
| 2009/0265290 A1 | 10/2009 | Ciaramita et al. | | |
| 2009/0287672 A1* | 11/2009 | Chakrabarti et al. | | 707/5 |
| 2010/0257053 A1 | 10/2010 | Ferber et al. | | |

FOREIGN PATENT DOCUMENTS

CN 101359997 A1 2/2009

OTHER PUBLICATIONS

Kumar et al., "Scheduling advertisements on a web page to maximize revenue", European J. Operational Research, vol. 173, No. 3, 2006, pp. 1067-1089.*
Search Report issued in international application No. PCT/CN2010/001976, mailed Jun. 16, 2011 (7 pages).
Written Opinion issued in international application No. PCT/CN2010/001976, mailed Jun. 16, 2011 (4 pages).

* cited by examiner

*Primary Examiner* — John G Weiss
*Assistant Examiner* — Scott C Anderson
(74) *Attorney, Agent, or Firm* — Brinks Gilson & Lione

(57) ABSTRACT

Systems and methods for placing ads in a block on a webpage are disclosed. Generally, two ranking models are trained using a first and second ads data set. The first model predicts a first click probability for each ad in the first ads data and rank the ads based on the eCPM. The second model is trained using the second ads data set comprising a subset of the first ads data set and interaction features related to ad position in the block. The second model predicts a second click probability for each ad in the second ads data set. An overall expected revenue for each arrangement of ads in the second ads data set is then calculated. The computer system selects the arrangement with maximum computed overall expected revenue and places the ads in the block on the webpage according to the selected arrangement.

24 Claims, 3 Drawing Sheets

SYSTEMS AND METHODS FOR LIST RANKING AND ADS PLACEMENT USING INTERACTION FEATURES

CROSS-REFERENCE TO RELATED APPLICATIONS

This application is a continuation of International Application No. PCT/CN2010/001976, filed on Dec. 6, 2010, which is hereby incorporated herein by reference in its entirety.

BACKGROUND

Sponsored Search is a proven solution for driving targeted leads to all types of businesses. Sponsored search places the ads on search results pages that are relevant to the advertisers, allowing the advertisers to target customers who are searching for the advertising product. The present disclosure is generally directed to sponsored search. More specifically, the present disclosure is directed to systems and methods for list ranking using interaction features and placing the ranked list on a block in a webpage. These systems and methods optimize the revenue and click efficiency of the displayed sponsored search results.

In sponsored search, the ads are shown in north, east and south sections of the webpage. Conventionally, the compass points refer to the top, right and bottom sections, respectively, of a web page, with search results listed along the left or west side of the page. The ads shown in the north section of the webpage are also called north ads. Bucket metrics showed that more than 66% revenue is yielded by the ads displayed in the north section. Also, the click efficiency in the north section is one of the most important metrics to the advertisers. The click efficiency is the number of clicks divided by the number of ads shown in the section of interest. For example, if a user clicks on one of the five ads in the north section on a webpage, the click efficiency is $1/5=20\%$. When advertising using an online advertisement service provider such as Yahoo! Search Marketing™, the advertisers would usually bid to put their ads in the north section because of the high click efficiency.

In conventional approach of ads ranking, the click probability of all candidates are independently evaluated by a model which is powered by the historical view/click data. Ads which are directed to the same search term are candidates to be placed on the web page, sorted and ranked. All ads which match a search term are ranked according to their estimated Cost Per Mille (eCPM), which is conceptually the product of the predicted clickability and its bid. Finally, the top ranked ads are placed in the north section of the page while the rest are placed in the east and south. The ads are placed in slots starting closest to the top of the page. There may be a predetermined number of slots in the north section or other sections, such as four slots.

Nonetheless, the conventional solution fails to optimize the arrangement of ads in a section. It would be desirable to develop additional systems and methods for ranking and placing ads in the same displaying section or other regions of the webpage.

SUMMARY

In the disclosed method, the interactions between ads are fully exploited. One embodiment of the new solution includes two phases in both offline and online: Phase 1 is ad preselection. In this stage, a first model is trained offline on historical view/click data to predict the click for an ad without using the interaction features between ads. In online serving, all the ad candidates are evaluated by the first model and a rough eCPM for each ad can be obtained. Correspondingly, the top N candidates are selected to be displayed in the north section. Phase 2 is list ranking phase. We train a second model offline only on the view/click data of north ads. All the interactions between ads are taken into consideration and used as features to build the second model. The disclosed method fully mines the interaction between ads placed in the north block. Compared with conventional methods, the disclosed method better optimizes the north revenue and click efficiency.

One embodiment discloses a computer implemented method or program for placing ads in a block or a section on a webpage. The computer implemented method includes the following steps. First, the program trains, in a computer system, a first model using a first ads data set. Second, the program predicts, in the computer system, a first click probability for each ad in the first ads data set by the first model. Third, the program trains, in the computer system, a second model using a second ads data set. The second dataset includes a subset of the first ads data set and interaction feature between each pair of ads in the subset. Fourth, the program predicts, in the computer system, a second click probability for each ad in the second ads data set. Fifth, the program computes, in the computer system, an overall expected revenue for each arrangement of ads in the second ads data set. Sixth, the program selects the arrangement with maximum computed overall expected revenue. Finally, the program places the ads in the block on the webpage according to the selected arrangement.

Another embodiment discloses a computer system for placing ads in a block on a webpage. The computer system includes a processor configured to train a first model using a first ads data set and the following modules or components. A first component is configured to predict a first click probability for each ad in the first ads data set by the first model. A second component is configured to train a second model using a second ads data set. The second dataset includes a subset of the first ads data set and interaction feature including at least one of the following: ad position in the block, neighboring ad in the block; and a semantic relation between each ad and the neighboring ad. A third component is configured to predict a second click probability for each ad in the second ads data set. A fourth component is configured to compute an overall expected revenue for each arrangement of ads in the second ads data set. A fifth component is configured to select the arrangement with maximum computed overall expected revenue. A sixth component is configured to place the ads in the block on the webpage according to the selected arrangement.

DETAILED DESCRIPTION OF THE DRAWINGS

The conventional solution fails to consider the interaction between ads. For example, if a user queries "basketball shoes," the first ad in the first slot may be for a store that sells Nike brand shoes. At the same time, if the second north slot is also related to a Nike brand ad, its chance to be clicked may be depressed by the first ad. Another example is: if the user sees two ads of stores selling similar products, with one of them saying "15% off" and the other saying "30% off". Then the chance of the "30% off" one will be increased due to the comparison. That is, the co-occurrence of similar ads in the same block creates interactions between each other. Interaction between ads in the same block may be related to some textual, graphical, visual or conceptual reasons. A user may tend to prefer, overlook, or not click one of the ads when other ads with high interaction are displayed in the same block. The conventional solutions evaluate the clickability of an ad independently without considering neighbor ads or interactions among the ads to be displayed in the same section.

The interaction features of an ad may have the following properties: 1) Interaction features of an ad is a subset of features that are used by a machine learned model to compute the click probability for the ad given a specific user query. 2) Interaction features of an ad are the features that depend on the ad's certain position and other ads in other positions of the same ad block. 3) Interaction features of an ad only make sense when firstly, this ad is assigned a certain position in a block; and secondly, other positions of the block are also assigned with specific ads. Some examples for interaction features of an ad X can be "the number of overlapped words between X's title and the title of the ad above X;" "how many ads in the same block with X share same domain name with X;" "The cosine similarity between X's description and the description of the ad below X," etc.

The present disclosure is directed to systems and methods for ranking ads list and placing ads using interaction features among ads candidates. An online advertisement service provider ("ad provider") may desire to arrange the ads optimally on the webpage so that more potential customers would be attracted to click on those displayed ads. The ads placement in the north section of the webpage is the most important to the ad provider because more than half of the revenue is yielded by the ads displayed in the north section. More clicks on the north ads will bring more revenue to the ad provider. It is one of the features of this disclosure to optimize the arrangement of north ads in the north section. However, the disclosed method may be used to optimize the arrangement of ads displayed in other desired sections.

Figure 1:
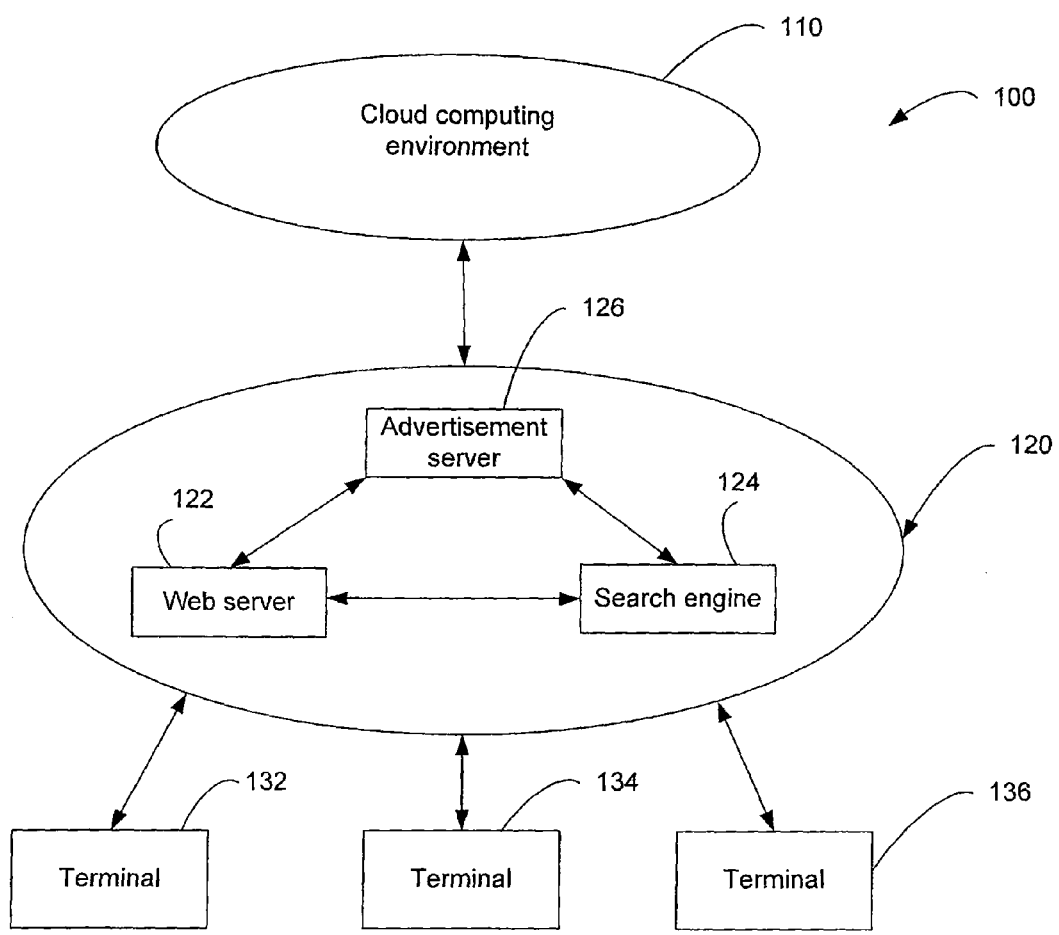
FIG. 1 is a block diagram of one embodiment of an environment in which a system for list ranking and ads placement may operate.

FIG. 1 is a block diagram of one embodiment of an environment in which a system for ranking ads list and placing ads may operate. However, it should be appreciated that the systems and methods described below are not limited to use with a search engine or pay-for-placement online advertising.

The environment 100 may include a cloud computing environment 110 and a connected server system 120 including a web server 122, a search engine 124, and an advertisement server 126. The web server 122 may be a computer, a server, or any other computing device known in the art, or the web server 122 may be a computer program, instructions, and/or software code stored on a computer-readable storage medium that runs on a processor of a single server, a plurality of servers, or any other type of computing device known in the art. The web server 122 delivers content, such as a web page, using the Hypertext Transfer Protocol and/or other protocols. The web server 122 may also be a virtual machine running a program that delivers content. The search engine 124 may be a computer system, one or more servers, or any other computing device known in the art, or the search engine 124 may be a computer program, instructions, and/or software code stored on a computer-readable storage medium that runs on a processor of a single server, a plurality of servers, or any other type of computing device known in the art. The search engine 124 is designed to help users find information located on the Internet or an intranet.

The advertisement server 126 may be a computer system, one or more servers, or any other computing device known in the art, or the advertisement server 126 may be a computer program, instructions and/or software code stored on a computer-readable storage medium that runs on a processor of a single server, a plurality of servers, or any other type of computing device known in the art. The advertisement server 126 is designed to provide digital ads to a web user based on display conditions requested by the advertiser.

The environment 100 may further include a plurality of terminals 132, 134, and 136. The terminals may be a computer, a smart phone, a personal digital aid, a digital reader, a Global Positioning System (GPS) receiver, or any other terminal that may be used to access the Internet.

Generally, an advertiser or any other user can use a terminal to access information on the server system 120. For example, the advertiser may purchase digital ads based on an auction model of buying ad space or a guaranteed delivery model by which an advertiser pays a minimum CPM to display the digital ad. Typically, advertisers would pay more for higher click probability. Ads displayed in the northern section of the webpage usually have the highest click probability by users searching a product using the search engine.

For example, when an Internet user utilizes one of the terminals 132, 134, 136 to submit a search query to the search engine 124, the search engine 124 may return a plurality of search results to the Internet user. The advertisement server 126 may additionally serve one or more digital ads to the Internet user based on search terms provided by the Internet user. In addition or alternatively, when an Internet user utilizes one of the terminals 132, 134, 136 to view a website served by the web server 122, the advertisement server 126 may serve one or more digital ads to the Internet user based on keywords obtained from the content of the website. The disclosed method may also apply to displaying ads on webpages, in games, or in any other situations or platforms with the need to display ads to potential customers.

Figure 2A:
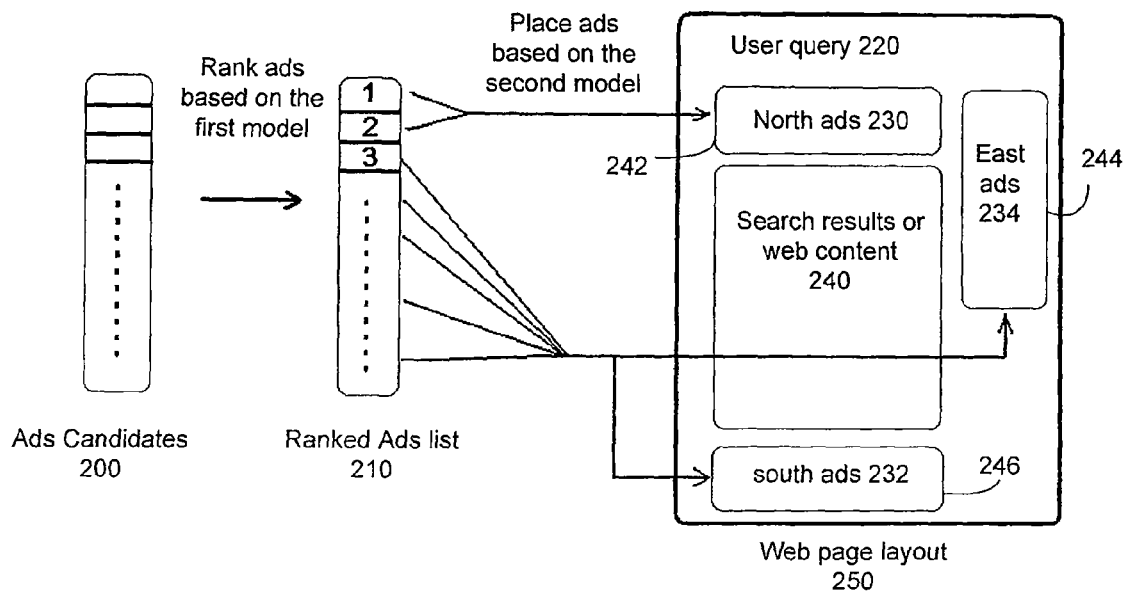
FIG. 2A is an illustration for ranking ads candidates and placing ads for advertisers using two models in two phases.

FIG. 2A is an illustration for ranking ads candidates and placing ads for advertisers using two models in two phases. For example, when a user searches or browses online, the ads 230, 232, and 234, may be displayed in blocks 242, 244, and 246 around the search results or web content 240 as in the web page layout 250 of FIG. 2A.

FIG. 2A is an illustration for ranking ads candidates and placing ads for advertisers using two models in two phases. Conventional solutions only have one ranking model that ranks the ads candidates 300 based on a first ranking model trained offline using the historical view/click data. The ranking model adopts a pointwise approach assuming that the ads candidates do not interact with each other. The historical view/click pairs are usually represented by numerical vectors, which are called feature vectors. The number of features in the feature vector, also called the dimension of the feature vector, in the conventional ranking model is less than 10.

In the conventional ranking model, the click probability of all ads candidates 300 are independently evaluated online by the trained first model. The estimated CPM (eCPM) of each ad candidate is then calculated as the product of the predicted click probability and its bid. Then all ads candidates are ranked according to their eCPM. Once the ads candidates are ranked, the top ads of the ranked list are shown on north section of the page while the rest ads are shown on east and south.

The disclosed methods have two ranking models in two phases. In the first phase, the first ranking mode is used to evaluate eCPM for all ads candidates 300 and generate a rank ads list 310. Then the top N ads candidates for the north block 242 are selected from the ranked ads list 310.

In the second phase, a second ranking model is introduced to find the optimal arrangement of the top N ads to be displayed in the north bock 242 on the webpage layout 250. The second model is also trained offline with only the view/click data of north ads. All the interactions between ads are taken into consideration and used as features to build the second model. The additional interaction features in the second model depend on the ads specific position in the north section 242 and its neighbor Ads.

Figure 2B:
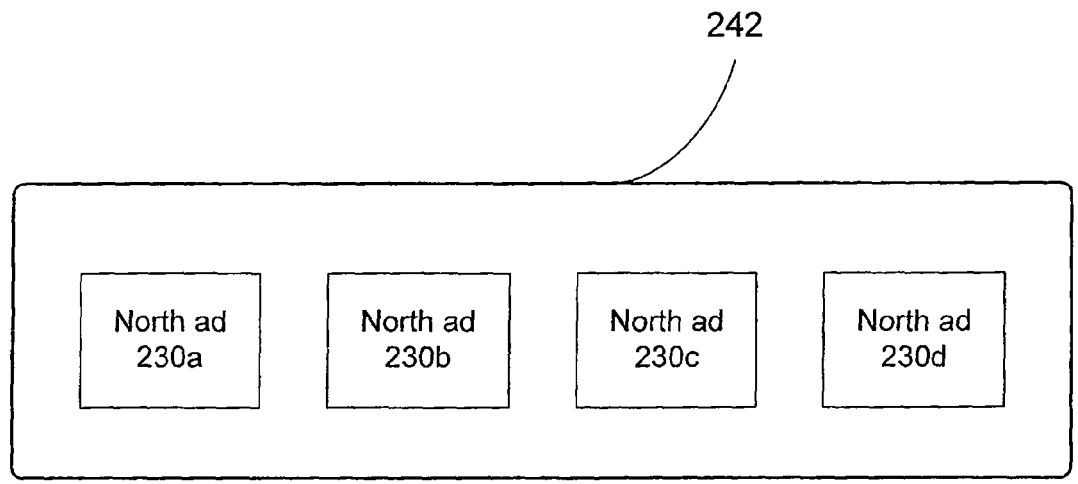
FIG. 2B is an illustration for placing ads candidates in the north section of a web page.

As in FIG. 2B, the north ad 230a has a specific position of 1 and one neighbor ad 230b. The north ad 230b has a specific position of 2 and two neighbor ads 230a and 230c. The north ad 230c has a specific position of 3 and two neighbor ads 230b and 230d. The north ad 230d has a specific position of 4 and one neighbor ad 230c.

The semantic relations between the neighboring ads may also be introduced as the interaction features. For example, interaction features for an ad may further include "how many words in the description of the ad are covered in its neighboring ads," "is there a common brand name in the ad and its neighboring ad," "does the ad and its neighboring ad share a common Uniform Resource Locator (URL) domain," "does the ad and its neighboring ad have a common bid term," or any other reasonable semantic relations. If the ads candidates are images or videos, the content similarities of and/or visual similarities of ads candidates may also be adopted as interaction features.

With these interaction features as well as the original features, the dimension of the feature vector may be larger than 12. Preferably, the dimension of the feature vector in the second ranking model is between 15 and 25. More preferably, the dimension of the feature vector in the second ranking model is between 17 and 20. The second ranking model is trained to predict the click probability for an ad in a certain "context." An example of the context may be a certain arrangement of all ads shown in the north section. An example of the training method may be based on a listwise approach to directly optimize the eCPM over all permutations of north ads in the training data. The ad provider thus can obtain a more accurate estimation on click probability and eCPM for each north ad 230 in the north section 242.

Once the second model is trained, in the computer system computes an overall expected revenue for each arrangement of north ads 230 in the north section 242. The computer system then selects the arrangement with maximum computed overall expected revenue and places the north ads 230 in the block 242 on the webpage layout 250 according to the selected arrangement.

Figure 3:
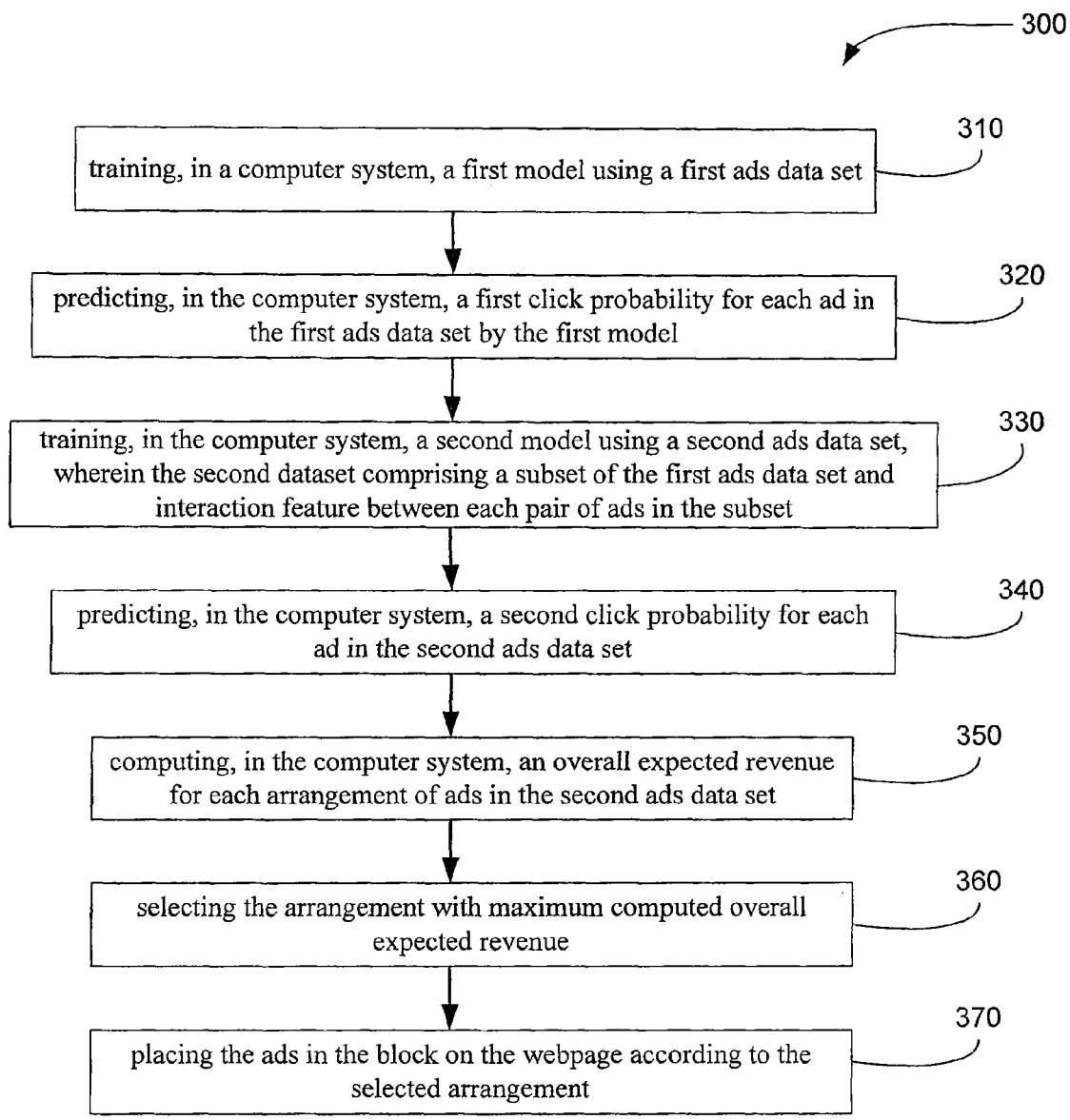
FIG. 3 is a block diagram of a system for ranking ad candidates and placing ads for advertisers using interaction features.

FIG. 3 is a block diagram 300 of a computer system for ranking ad candidates and placing ads for advertisers using interaction features. The computer system includes computers with processors and computer readable media such as hard disk; computer memory, or other data storage hardware. A computer implemented method in the computer system may include the following steps. Other steps may be added or substituted.

In step 310, the computer system trains a first ranking model using a first ads data set. The first ads data set includes the historical view and click data for all ads candidates to be displayed on the webpage. The dimension of the feature set in the first ranking model is less than 10.

In step 320, the computer system predicts a first click probability for each ad in the first ads data set by the first ranking model. The computer system then computes a first eCPM based on the first click probability and corresponding bid for each ad in the first ads data set and ranks the ads according to their eCPM. The top N ads candidates are then selected from the ranked first ads data set. N is predetermined by the ad provider. For example, N may be between 3 and 8 for webpages displayed on personal computers. N may be between 1 and 4 for webpages displayed on mobile terminals such as smart phones, GPS, and any other terminals with a smaller display screen.

In step 330, the computer system trains a second ranking model using a second ads data set. The second dataset includes a subset of the first ads data set and interaction feature between each pair of ads in the subset. The subset of the first ads data set includes the top N ads candidates and their corresponding historical view/click data. Additional interaction features of the top N ads are added to the feature vectors for training the second ranking model.

The interaction feature includes at least one of the following: ad position in the block; neighboring ad in the block; and a semantic relation between each ad and the neighboring ad. The semantic relation includes at least one of the following: number of common words between each ad and the neighboring ad; common brand name between each ad and the neighboring ad; common Uniform Resource Locator (URL) domain between each ad and the neighboring ad; and common bid term between each ad and the neighboring ad. The interaction feature may further include content similarities between neighboring ads for video ads. The interaction feature may also include content visual similarities between neighboring ads.

In step 340, the computer system predicts a second click probability for each north ad candidate in the second ads data set. The second click probability may vary if the interaction features such as the position of the ad in the north block changes. For each different arrangement of north ads in the north block, the click probability of all north ads may have to be updated. This step may be implemented online. The selected top N ads candidates are enumerated all their permutations on the M slots in the north block. The total number of permutations is $N*(N-1)* \ldots *(N-M+1)$. N is usually larger or equal than M. For example, both M and N are 4 in one embodiment of the disclosure.

In step 350, the computer system then evaluates the overall click and revenue yielded by each permutation arrangement using the second ranking model. In the evaluation, every slot is assigned with a certain Ad. So the interaction features of each Ad can be collected and used.

In step 360, the computer system selects the permutation arrangement with maximum computed overall expected revenue.

In step 370, the computer system places the ads in the block on the webpage according to the selected arrangement.

The disclosed computer implemented method may be stored in computer-readable storage medium. The computer-readable storage medium is accessible to at least one processor. The processor is configured to implement the stored instructions to rank and place the ads in a block on a webpage accordingly.

From the foregoing, it can be seen that the present embodiments provide an optimized solution to increase ads revenue from a block in the webpage. The disclosed embodiments find the best arrangement of ads by considering the interaction among ads displayed in the same block. Although the examples are about finding the best arrangement for north ads in the north section, the disclosed methods and systems may be used to find the best arrangements in other sections or blocks.

It is therefore intended that the foregoing detailed description be regarded as illustrative rather than limiting, and that it be understood that it is the following claims, including all equivalents, that are intended to define the spirit and scope of this invention.

The invention claimed is:

1. A computer implemented method for placing ads on a webpage, the method comprising:
    training, in a computer system, a first model using a first ads data set;
    predicting, in the computer system, a first click probability for each ad in the first ads data set by the first model;
    training, in the computer system, a second model using a second ads data set, wherein the second dataset comprises a subset of the first ads data set and an interaction feature between each pair of ads in the subset;
    predicting, in the computer system, a second click probability for each ad in the second ads data set;
    computing, in the computer system, an overall expected revenue for each arrangement of ads in the second ads data set;
    selecting the arrangement with maximum computed overall expected revenue; and
    placing the ads in a block on the webpage according to the selected arrangement,
    wherein the interaction feature comprises at least one of the following: ad position in the block; neighboring ad in the block; and a semantic relation between each ad and the neighboring ad.

2. The computer implemented method of claim 1, wherein placing the ads in the block on the webpage according to the selected arrangement comprises placing the ads in a north block on an upper half of the webpage.

3. The computer implemented method of claim 1, wherein the overall expected revenue of the placed ads in the block is more than a total revenue from other blocks on the webpage.

4. The computer implemented method of claim 1, wherein the first ads data set comprises historical view and click data for all ads candidates to be displayed on the webpage.

5. The computer implemented method of claim 1, further comprising:
    computing a first estimated Cost Per Mille (eCPM) based on the first click probability and a corresponding bid for each ad in the first ads data set.

6. The computer implemented method of claim 5, further comprising selecting the subset of the first ads data set based on the computed eCPM so that the second ads data set comprises a top N ads having highest computed eCPM for some value of N.

7. The computer implemented method of claim 6, wherein N is a predetermined number less than 8.

8. The computer implemented method of claim 1, wherein the semantic relation comprises at least one of the following:
    number of common words between each ad and the neighboring ad;
    whether there is a common brand name between each ad and the neighboring ad;
    whether there is a common Uniform Resource Locator (URL) domain between each ad and the neighboring ad; and
    whether there is a common bid term between each ad and the neighboring ad.

9. A non-transitory computer-readable storage medium storing a set of instructions for placing ads on a webpage, the set of instructions to direct a processor to perform acts of:
    training, in a computer system, a first model using a first ads data set;
    predicting, in the computer system, a first click probability for each ad in the first ads data set by the first model;
    training, in the computer system, a second model using a second ads data set, wherein the second dataset comprises a subset of the first ads data set and an interaction feature between each pair of ads in the subset;
    predicting, in the computer system, a second click probability for each ad in the second ads data set;
    computing, in the computer system, an overall expected revenue for each arrangement of ads in the second ads data set;
    selecting the arrangement with maximum computed overall expected revenue; and
    placing the ads in a block on the webpage according to the selected arrangement,
    wherein the interaction feature comprises at least one of the following: ad position in the block; neighboring ad in the block; and a semantic relation between each ad and the neighboring ad.

10. The non-transitory computer-readable storage medium of claim 9, wherein placing the ads in the block on the webpage according to the selected arrangement comprises placing the ads in a north block on an upper half of the webpage.

11. The non-transitory computer-readable storage medium of claim 9, wherein the overall expected revenue of the placed ads in the block is more than a total revenue from other blocks on the webpage.

12. The non-transitory computer-readable storage medium of claim 9, wherein the first ads data set comprises historical view and click data for all ads candidates to be displayed on the webpage.

13. The non-transitory computer-readable storage medium of claim 9, further comprising:
    computing a first estimated Cost Per Mille (eCPM) based on the first click probability and a corresponding bid for each ad in the first ads data set.

14. The non-transitory computer-readable storage medium of claim 13, wherein the set of instructions directs the processor to select the subset of the first ads data set based on the computed eCPM so that the second ads data set comprises a top N ads having highest computed eCPM for some value of N.

15. The non-transitory computer-readable storage medium of claim 14, wherein N is a predetermined number less than 8.

16. The non-transitory computer-readable storage medium of claim 9, wherein the semantic relation comprises at least one of the following:
    number of common words between each ad and the neighboring ad;
    whether there is a common brand name between each ad and the neighboring ad;
    whether there is a common Uniform Resource Locator (URL) domain between each ad and the neighboring ad; and
    whether there is a common bid term between each ad and the neighboring ad.

17. A computer system for placing ads on a webpage, the computer system comprising:
    a processor configured to train a first model using a first ads data set; and a first component that predicts a first click probability for each ad in the first ads data set by the first model, a second component that trains a second model using a second ads data set, wherein the second dataset comprises a subset of the first ads data set and an interaction feature comprises at least one of the following: ad position in the block, neighboring ad in the block; and a semantic relation between each ad and the neighboring ad;

a third component that predicts a second click probability for each ad in the second ads data set; and a fourth component that computes an overall expected revenue for each arrangement of ads in the second ads data set; and a fifth component that selects the arrangement with maximum computed overall expected revenue; and places one or more ads in the block on the webpage according to the selected arrangement.

18. The computer system of claim 17, wherein the fifth component places the ads in a north block on an upper half of the webpage.

19. The computer system of claim 17, wherein the overall expected revenue of the placed ads in the block is more than a total revenue from other blocks on the webpage.

20. The computer system of claim 17, wherein the first ads data set comprises historical view and click data for all ads candidates to be displayed on the webpage.

21. The computer system of claim 17, wherein the computer system computes a first estimated Cost Per Mille (eCPM) based on the first click probability and a corresponding bid for each ad in the first ads data set.

22. The computer system of claim 21, wherein the computer system selects the subset of the first ads data set based on the computed eCPM so that the second ads data set comprises a top N ads having highest computed eCPM for some value of N.

23. The computer system of claim 22, wherein N is a predetermined number less than 8.

24. The computer system of claim 17, wherein the semantic relation comprises at least one of the following:
- number of common words between each ad and the neighboring ad;
- whether there is a common brand name between each ad and the neighboring ad;
- whether there is a common Uniform Resource Locator (URL) domain between each ad and the neighboring ad; and
- whether there is a common bid term between each ad and the neighboring ad.

* * * * *